E. L. THOMPSON.
VEHICLE TIRE.
APPLICATION FILED AUG. 8, 1914.
1,129,528. Patented Feb. 23, 1915.
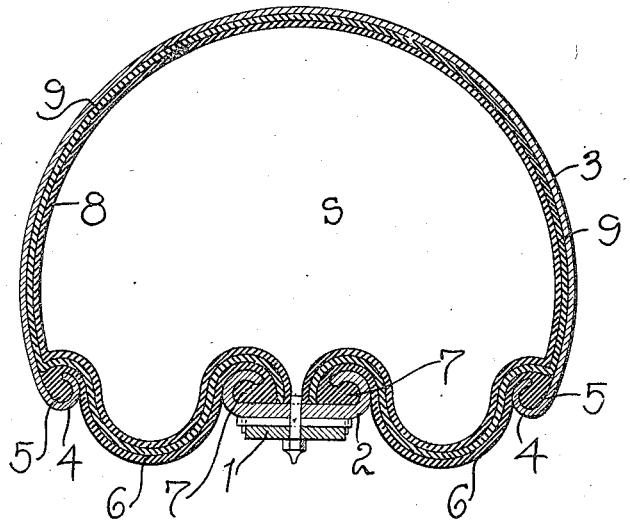
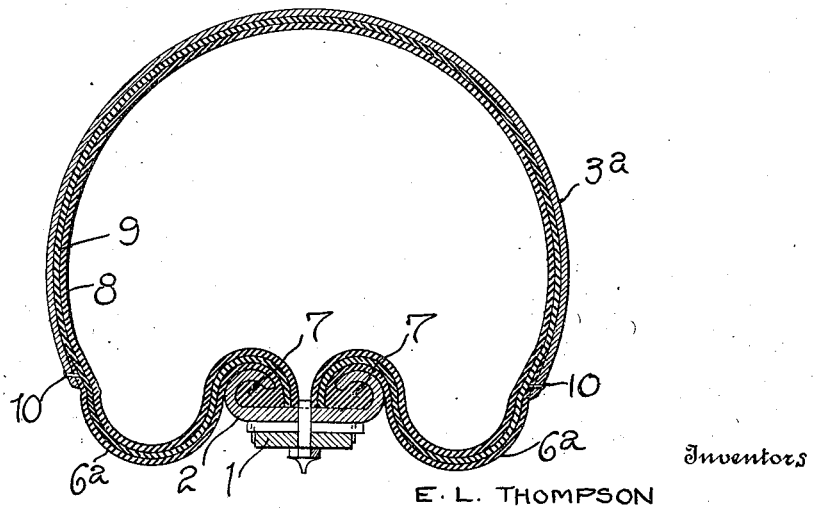
E. L. THOMPSON

UNITED STATES PATENT OFFICE.

EDWARD LOUIS THOMPSON, OF GLENNS FERRY, IDAHO, ASSIGNOR OF ONE-HALF TO BEN H. CORNELL, OF GLENNS FERRY, IDAHO.

VEHICLE-TIRE.

1,129,528. Specification of Letters Patent. Patented Feb. 23, 1915.

Application filed August 8, 1914. Serial No. 855,812.

*To all whom it may concern:*

Be it known that I, EDWARD L. THOMPSON, a citizen of the United States, residing at Glenns Ferry, in the county of Elmore and State of Idaho, have invented certain new and useful Improvements in Vehicle-Tires, of which the following is a specification, reference being had to the accompanying drawings.

This invention relates to certain improvements in vehicle tires and has relation more particularly to a device of this general character especially designed and adapted for use in connection with automobiles or similar vehicles; and the object of the invention is to provide a device of this general character having novel and improved means whereby a tire will possess the maximum of yielding qualities while constructed so as to generally reduce the cost of the upkeep thereof and to eliminate punctures.

The invention consists in the details of construction and in the combination and arrangement of the several parts of my improved vehicle tire whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1 is a transverse sectional view taken through a tire constructed in accordance with an embodiment of my invention; and Fig. 2 is a transverse sectional view taken through a tire constructed in accordance with a further embodiment of my invention.

As disclosed in the accompanying drawings, 1 denotes the felly of a wheel of any ordinary or preferred construction and having coacting therewith, the channel rim 2. Further details as to the felly 1 and rim 2 are believed to be unnecessary as the same may be constructed in accordance with the requirements of practice, although I prefer to have the same of a demountable type as the tire structure, to be hereinafter more particularly referred to, can be applied with greater convenience.

3 denotes a metallic tread member segmental in form and in excess of a semi-circle and having its free marginal portions curved inwardly, as indicated at 4 in the embodiment of my invention as disclosed in Fig. 1, to receive the beads 5 produced along the outer longitudinal margin of the rubber structure 6, the opposite longitudinal margin whereof being provided with the outwardly disposed beads 7 adapted to be snugly accommodated within the channel rim 2, as is believed to be clearly apparent to those skilled in the art to which my present invention appertains.

The tread member 3 and the rubber structures 6 are adapted to substantially entirely incase the tire proper which is herein set forth as composed of the inner tube 8 and the casing 9, which casing 9 may be formed of canvas or other suitable material which may be employed with equal facility.

It will be readily perceived, in view of the foregoing, that in the form of invention disclosed in Fig. 1, the pressure of the air within the tire or space S will serve to maintain the structure in assembled relation.

The form of invention disclosed in Fig. 2 is substantially identical as that set forth in Fig. 1, except that the metallic tread member 3ª is permanently engaged with the rubber structures 6ª through the medium of the rivets 10 or the like. It is to be observed that the rubber structures 6 and 6ª are disposed on a downward curvature. By this arrangement, I have found in practice that a greater margin for movement is permitted which greatly enhances the advantages of the tire structure, as it will be readily perceived that the tire structure is permitted, with greater convenience, to move up and down or back and forth.

It is to be understood that when an automobile or the like equipped with tires constructed in accordance with my invention is running over a smooth surface with comparatively no jar, the tread member 3 or 3ª is in the position as illustrated in the accompanying drawings, but in case of a sudden or heavy jar, the wheel to which the tire is attached will work up and down relative to the metal tread and thus effectively absorb the jar, as is believed to be self-evident.

From the foregoing description, it is thought to be obvious that a vehicle tire constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

The combination with a wheel and a tire disposed around the rim thereof, of a tread member segmental in cross section and in excess of a semi-circle disposed around the tire, a flexible structure secured to each edge portion of the tread member, the opposite marginal portion of each of such structures being detachably engaged with the rim of the wheel, said tread member and flexible structures serving to maintain the tire in operative position upon the wheel.

In testimony whereof I hereunto affix my signature in the presence of two witnesses.

EDWARD LOUIS THOMPSON.

Witnesses:
  Ed. M. Clark,
  S. H. McAunty.